United States Patent [19]
Johnson

[11] 3,774,519
[45] Nov. 27, 1973

[54] FOLDING TRIPOD ADAPTER

[75] Inventor: Bruce K. Johnson, Andover, Mass.

[73] Assignee: Polaroid Corporation, Cambridge, Mass.

[22] Filed: Apr. 24, 1972

[21] Appl. No.: 246,810

[52] U.S. Cl. .................................. 95/86, 352/243
[51] Int. Cl. ........................................ G03b 17/56
[58] Field of Search ...................... 95/86; 352/243

[56] References Cited
UNITED STATES PATENTS

| | | | |
|---|---|---|---|
| 3,291,179 | 12/1966 | Lang | 95/86 X |
| 1,787,309 | 12/1930 | Goldbeck | 352/243 |
| 2,935,006 | 5/1960 | Everetts | 95/86 |
| 2,567,068 | 9/1951 | Halmer | 95/86 X |
| 2,326,657 | 8/1943 | Johnston | 95/86 |
| 2,481,717 | 9/1949 | Blair | 95/86 X |
| 2,922,609 | 1/1960 | Collier | 95/86 X |
| 3,164,838 | 1/1965 | Heinrich | 352/243 X |

FOREIGN PATENTS OR APPLICATIONS

| | | | |
|---|---|---|---|
| 943,046 | 11/1963 | Great Britain | 95/86 |
| 1,104,713 | 4/1961 | Germany | 95/86 |

*Primary Examiner*—Samuel S. Matthews
*Assistant Examiner*—E. M. Bero
*Attorney*—William A. Danchuk

[57] ABSTRACT

A folding adapter for use with a photographic camera having an optical axis in a non-parallel orientation with respect to a supporting base of the camera. The adapter includes a first section for supporting a photographic camera and a second section pivotally connected to the first. The first section is angularly movable with respect to the second section. The adapter permits a realignment of the camera's optical axis to a horizontal position such that it may be conveniently coupled with a conventional tripod or positioned on a flat surface.

13 Claims, 5 Drawing Figures

FOLDING TRIPOD ADAPTER

BACKGROUND OF THE INVENTION

A new variety of photographic cameras has been developed by the assignee of this application which, in part, are characterized in having an optical axis oriented at an acute angle to the base of the camera body. Exemplary of this variety of camera are those shown in U.S. Pat. Nos. 3,589,253; 3,641,889; and 3,618,493. As shown in the referenced patents, the optical axis of the camera lens is in a nonparallel orientation with respect to the supporting base of the camera. Accordingly, if the supporting base of the camera is employed to support the camera on a typical tripod mount, the camera's optical axis will be directed not toward the horizon but below it. Moreover, the camera, as configured, may not be easily placed on any convenient flat surface, e.g., a table, for time exposure pictures.

One way of achieving the same results is to provide for a bed foot arrangement on the camera bottom. While permitting an operative placement of the camera on a table, a bed foot arrangement does not allow the camera to be mounted on a standard tripod. Therefore, this type of arrangement does not solve the problem.

SUMMARY

In order to provide for these and other conveniences, a tripod adapter has been designed which permits the mounting of the camera to a typical tripod. When properly mounted upon the camera, the adapter permits the horizontal mounting of the camera on the tripod. Additionally, the adapter may be used to position the camera's optical axis parallel to the horizon when the latter is placed on any horizontal surface should a tripod be unavailable or undesirable.

The tripod adapter has the advantage of being easily installed and removed without recourse to sophisticated mechanical gadgetry. Additionally, the adapter may be folded into a compact assemblage which may be left on the camera or conveniently carried by the camera user.

It is therefore a general object of this invention to provide a foldable adapter for a photographic camera having an optical axis which is not parallel to the supporting base of the camera.

It is another object and feature of the present invention to provide an inexpensive and uncomplicated variable folding tripod adapter for use in conjunction with a photographic camera.

A further object and feature of the present invention is to provide a tripod adapter for use in conjunction with a photographic camera, the tripod adapter including a first surface for coupling to and supporting the base of the camera; a second surface pivotally connected to the first surface, the second surface and the first surface being adapted to be angularly separated an amount equal to the angular separation between the supporting base of the camera and the optical axis of the camera or folded when said folding adapter is operatively connected to said camera, and means for attaching the tripod adapter to the camera.

Further objects and advantages of the invention will in part be obvious and will in part become apparent as the following description proceeds. The features of novelty which characterize the invention will be pointed out with particularity in the claims annexed to and forming part of this specification.

Figure 1:
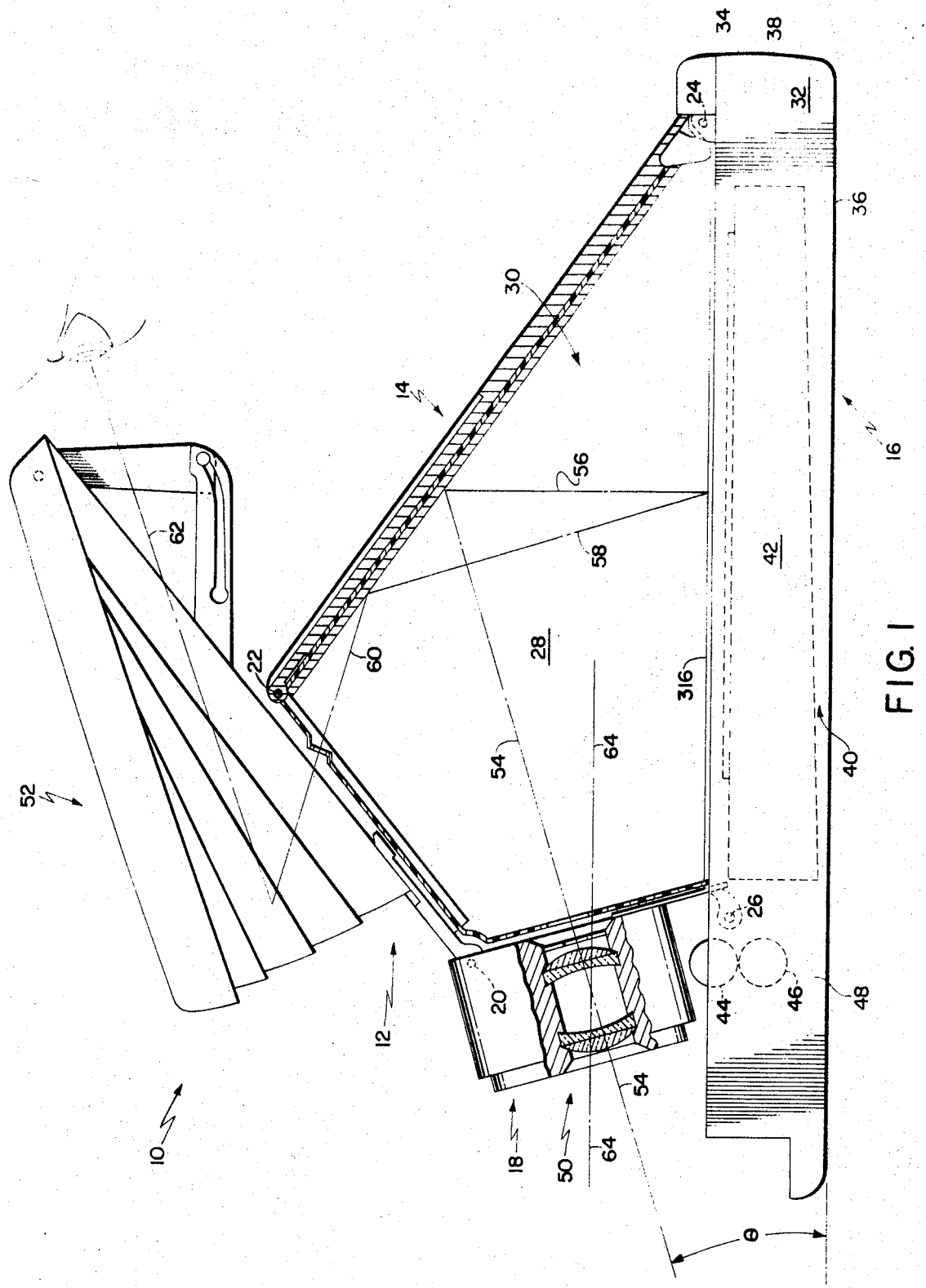
FIG. 1 is a lateral view of a photographic camera with which the present invention is employed.

DESCRIPTION OF THE PREFERRED EMBODIMENT:

Reference is now made to FIG. 1 wherein there is shown a foldable, single lens reflex camera 10 of the self-developing type in its extended or operative position. Camera 10 includes first, second, third and fourth housing sections 12, 14, 16 and 18, respectively, pivotally coupled to each other at pivots 20, 22, 24 and 26 for relative movement between a folded configuration (not shown) and the extended position as shown in FIG. 1. Housing sections 12, 14, 16 and 18 cooperate with a flexible bellows 28, secured thereto to form a six-sided exposure chamber 30. Third housing section 16 includes a pair of laterally spaced side walls 32 and 34 interconnected by a bottom wall 36 and an end wall 38 to define a U-shaped chamber 40 for receiving a film assemblage 42 shown in dashed lines therein. Extending forwardly of chamber 40 are a pair of rollers 44 and 46. Rollers 44 and 46 are mounted upon a roller support housing 48. Roller housing 48 is pivotally coupled to third housing section 16 and is adapted to be pivoted in a counterclockwise manner to move rollers 44 and 46 to a position wherein a film container 42 may be inserted into or withdrawn from chamber 40. Finally, fourth housing section 18 is pivotally coupled near its ends to housing sections 12 and 16 and is provided with means for mounting a lens and a shutter assembly 50 and a shutter release button (not shown).

A viewing device 52 is mounted on first housing section 12 for movement between an operative position, as shown in FIG. 1, and an inoperative position (not shown). For a fuller understanding of the features and operation of viewing device 52, reference should be made to a copending application for United States Patent entitled "Photographic Apparatus" by Richard J. Fraser and John E. McGrath, Jr., Serial No. 203,735, filed Dec. 1, 1971 and assigned in common herewith.

Lens and shutter assembly 50 are so oriented to define an optical axis 54 which is perpendicular to fourth housing section 18. Light passing along optical axis is reflectively redirected a series of times, by a plurality of mirrored surfaces (not shown), within camera 10, as may be evidenced by its light path shown by lines 56, 58, 60 and 62. The optical axis 54 of lens and shutter assembly 50 is oriented at an acute angle $\theta$ with respect to third housing section 16 which acts as a support base for camera 10. In one preferred embodiment of camera 10, this angle $\theta$ is equal to approximately 15°. Thus, lens assembly 50 is directed at an angle of 15° below the horizon, as shown by line 64, and therefore, must be redirected for the majority of photographs which the camera user might take. It should become apparent that using third housing section 16 as a base alone would be inconvenient for time exposure or self-timed photographs.

Figure 2:
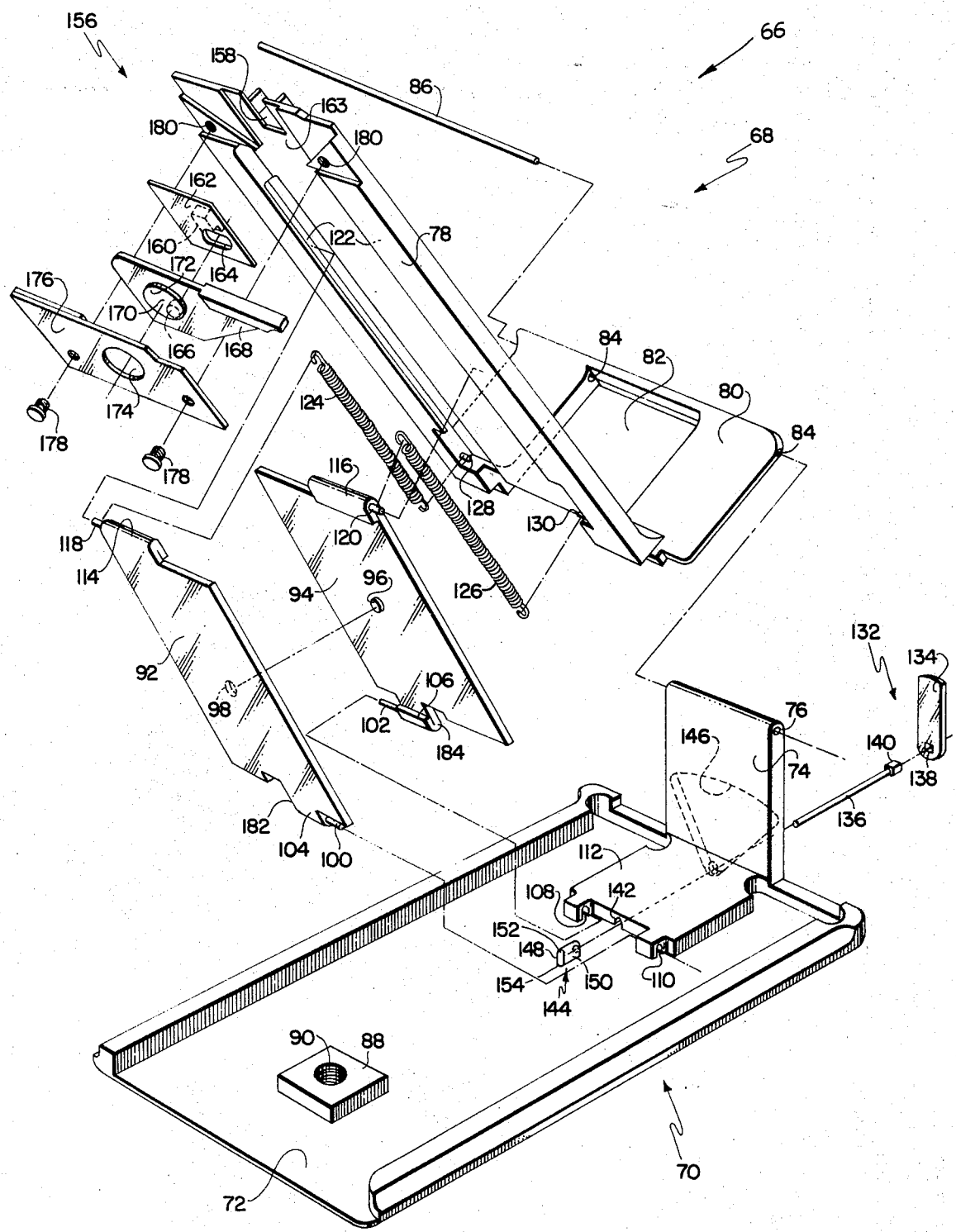
FIG. 2 is an exploded perspective view of a preferred embodiment of the tripod adapter of the present invention.

Looking to FIG. 2, there is shown a variable folding tripod according to the preferred embodiment of the present invention. Adapter 66 is formed having a first portion 68 and a second base portion 70 pivotally mounted to first portion 68. Second portion 70 is formed having a generally flat support portion 72 and a vertical rear wall portion 74. The central portion of second portion 70 is depressed for accommodating the component parts of adapter 66 when the latter is in a folded state. The top of vertical wall portion 74 contains a bore 76 which serves as a pivot for first portion 68. First portion 68 which is engageable with camera 10 is also configured having a flat portion 78 and a vertical rear wall portion 80. Vertical rear wall portion 80 has a slot 82 formed therein which is equal in size to the vertical rear wall portion 74 of second portion 70. A bore 84 is provided in the top of wall portion 80. A rod extends through bores 84 and 76 and pivotally couples vertical rear wall portions 74 and 80 as well as first and second portions 68 and 70. A boss member 88 is provided on second portion 70. Boss member 88 has a threaded bore 90 formed therein which extends through second portion 70 for accepting the mounting screw (not shown) of a conventional tripod. The remaining structure shown in FIG. 2 is used for locking first portion 68 at an operative angle with respect to second portion 70.

Figure 3:
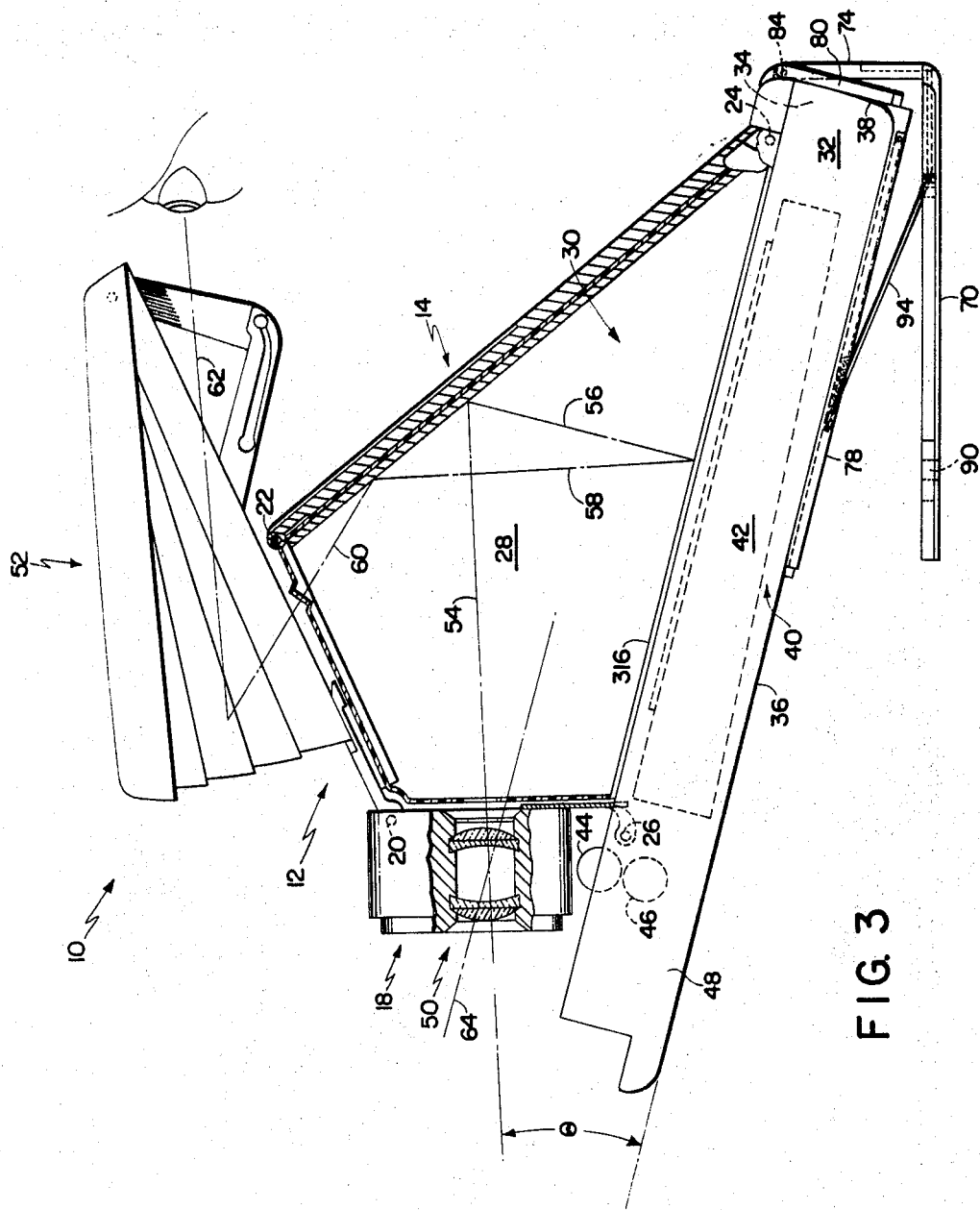
FIG. 3 is a lateral view of the photographic camera of FIG. 1 mounted upon the preferred embodiment of the tripod adapter according to the present invention.

When first portion 68 is pivotally erected to its operative position (as shown in FIG. 3), it is locked there by a mechanism which is not like a pair of scissors. A pair of blades 92 and 94 are pivotally coupled to each other through a pin 96 formed on blade 94 and a suitably sized hole 98 formed on blade 92. Blades 92 and 94 are pivotally mounted to second portion 70 by pins 100 and 102 fixedly attached to blades 92 and 94, respectively. Pin 100 is captured by an end extension 104 of blade 92 and pin 102 is similarly captured by an end extension 106 of blade 94. Pins 100 and 102, respectively, are pivotally captured by two holes 108 and 110 formed in a raised platform 112 of second portion 70. The opposite ends of blades 92 and 94 are formed having end extensions 114 and 116, respectively. Two pins 118 and 120 are captured by end extensions 114 and 116, respectively. Pins 118 and 120 ride within two lateral slots 122 formed with a bottom portion of first portion 68. Two coiled erecting springs 124 and 126 are connected between pins 118 and 120 and two other pins 128 and 130 formed on a rearward area of the bottom portion of first portion 68.

Located at the vertical rear wall portion 74 is an actuator assembly 132 for the locking mechanism of adapter 66. An actuator arm 134 is connected to a rod 136 through a square hole 138 and rod end 140. Rod 136 extends through a bore 142 formed within platform 112 and terminates in an oblong shaped tab 144. When properly assembled, arm 134 moves within a pie-shaped depression 146 formed within the rearward side of vertical rear wall portion 74. Tab 144 has two lateral surfaces 148 and 150 which are generally flattened. The top 152 and bottom 154 of tab 144 are rounded for reasons which will become apparent below.

Adapter 66 is attached to camera 10 by a latch assembly shown generally at 156. A notch 158 is cut into the forwardmost portion of first portion 68 for accommodating a hook 160 formed on a plate member 162 which extends through notch 158 to the top surface of first portion 68. Plate member 162 rides in a slot 163 formed below notch 158. Also formed in plate member 162 is an oblong hole 164 which is operative to capture a pin 166 fixedly attached to a latch actuating arm 168. Arm 168 has a pivot point 170 which is provided by a disk pivot 172 which fits within a hole 174 formed in a cover plate 176. Cover plate 176 is attached to first portion 68 by two screws 178 which cooperate with two holes 180 formed on the bottom of first portion 68. Pin 166 is not centered on the pivot point 170 of arm 168 and therefore acts as an eccentric pin drive for plate 162 through oblong hole 164. When arm 168 is in the position shown in FIG. 2 hook 160 is in its most rearward position in which it cooperates with a suitable hole (not shown) provided on the bottom of camera housing 16. If arm 168 is pivoted clockwise, the pin 166 will drive plate 162 within slot 163 forwardly to unlatch hook 160 from the hole provided within housing 16 of camera 10. Vertical wall 80 of first portion 68 engages rear wall 38 of camera 10 to lock adapter 66 to camera 10 when latch assembly 156 is latched into the camera hole.

Figure 4:
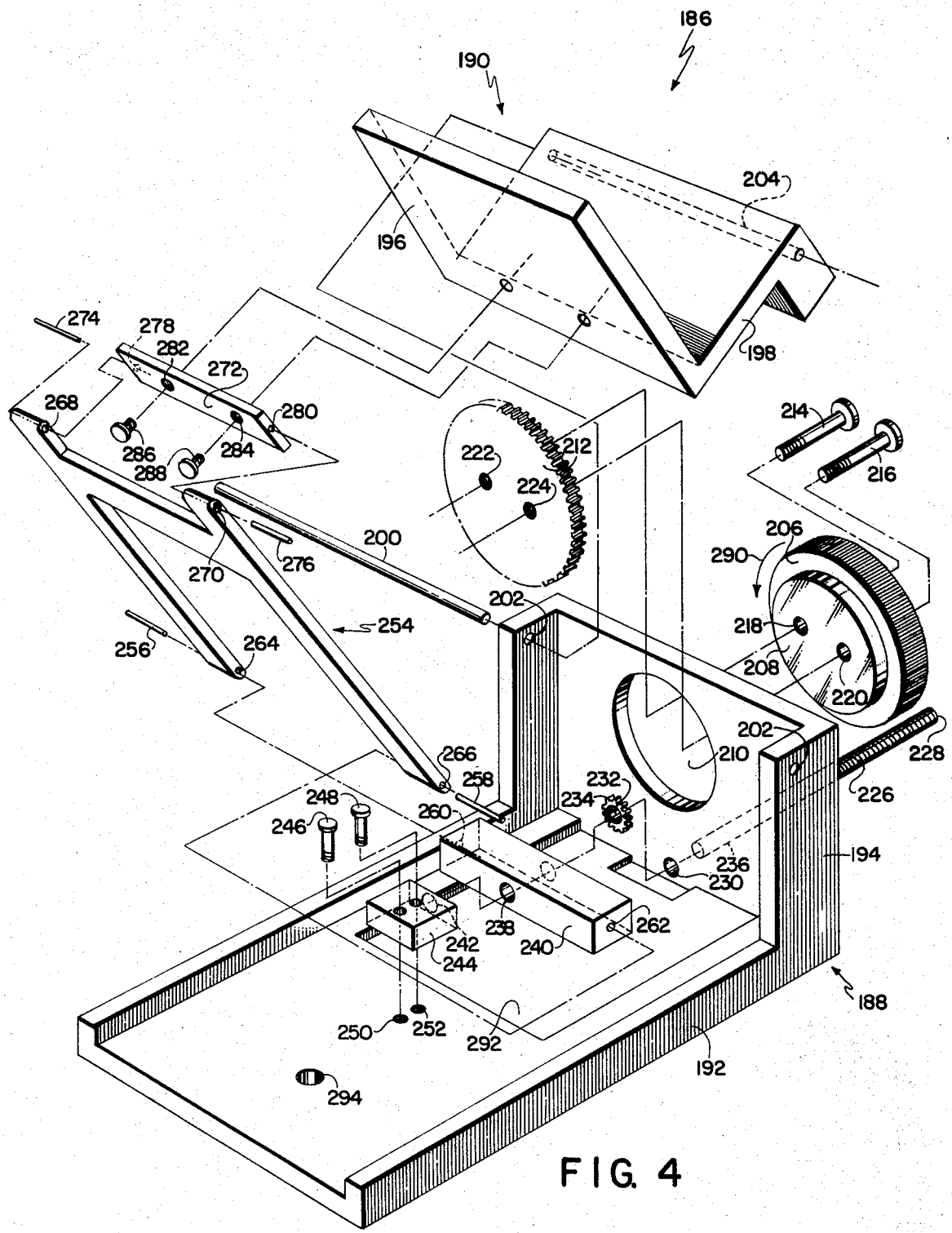
FIG. 4 is an exploded perspective view of a second embodiment of the tripod adapter according to the present invention.

When adapter 66 is properly attached to camera 10, arm 134 is moved to release first portion 68 to pivot upwardly under the influence of coiled springs 124 and 126. When the angular separation between first and second portions 68 and 70 (approximately 15°) is sufficient to reorientate the optical axis 54 of camera 10 parallel to the horizon, arm 134 is moved to lock first portion 68. While adapter 66 is primarily used at its 15° elevation, it should be noted that it may be used at a variety of different angles greater than or less than 15°, as the particular circumstances or personal whims of the user dictate. When arm 134 is in its locked position, tab 144 is in a position wherein its rounded portions 152 and 154 contact the inside portions 182 and 184 of the end extensions 104 and 106 of blades 92 and 94, respectively. Since tab 144 is longer between ends 152 and 154 than between its sides 148 and 150, the rotation of tab 144 cams the end of extensions 104 and 106 away from each other. Due to the pivotal coupling between blades 92 and 94 through pin 96 and hole 98, there is a similar separation between end extensions 114 and 116. Blades 92 and 94 are being opened slightly like a pair of scissors. As end extensions 114 and 116 are separated, their respective pins 118 and 120 are moved outwardly and are pushed up against the outer edges of slots 122 in which they ride. When pins 118 and 120 are moved apart a sufficient amount they push against the outer edges of slots 122 enough to frictionally fix them within slots 122. Accordingly, pins 118 and 120 can no longer ride within slots 122, as they do when first portion 68 is pivoted with respect to second portion 70, and first portion 70 is locked at its operative position with camera 10 mounted upon it. This position can be best seen by referring to FIG. 3. Note, that as shown, optical axis 54 is now in a position parallel to the horizon in which the adapter may be conveniently coupled to a tripod or merely placed upon a level surface such as a table. It should also be noted that this embodiment has the advantage of being coupled to camera 10 even when the camera is folded as adapter 66 is attached through the bottom housing 16 and rear wall 38. A second embodiment of the present invention is shown in FIG. 4.

An adapter 186 is shown having an L-shaped base support section 188 and an L-shaped camera support section 190. Section 188 has a horizontal base 192 and a vertical wall section 194. Likewise, section 190 has a horizontal portion 196 and a vertical portion 198. Section 190 is pivotally coupled to vertical section 194 of section 188 by a rod 200 which extends through holes 202 formed in vertical section 194 and a bore 204 in vertical section 198 of camera support section 190. The remaining structure shown is for elevating section 190 from section 188 to achieve an angular separation of 15 degrees between the two as explained in the first embodiment.

Positioned behind vertical wall section 194 is a knurled wheel 206 a portion 208 of which extends through a hole 210 formed in vertical wall 194. Positioned on the inside of wall 194 is a gear 212. Gear 212 and wheel 206 are rotatably united by two bolts 214 and 216 which extend through holes 218 and 220 in wheel 206 and through holes 222 and 224 formed in gear 212. A threaded rod 226 has one of its ends 228 mounted in a partial hole 230 formed in a lower portion of wall 194. Rod 228 passes through a second hole 232 formed within a small gear 234. Gears 234 and 212 are positioned such that they engage with one another. The remaining end 236 of rod 226 passes through a threaded bore 238 formed within a block 240 and then into a partial hole 242 formed in a second block 244. Block 244 is fixedly attached to the horizontal base section 192 of support section 188 by two bolts 246 and 248 which cooperate with two holes 250 and 252 formed within section 192.

Pivotally mounted to block 240 is an H-shaped member 254. Member 254 is mounted to block 240 by two pins 256 and 258 which are captured by holes 260 and 262 in block 240 and by two bores 264 and 266 formed within the lower extensions of member 254. The top extensions of member 254 have bores 268 and 270 formed within them for pivotally supporting a mounting block 272. Block 272 is mounted by pins 274 and 276 which extend through bores 268 and 270 and into two partial holes 278 and 280 formed in block 272. Also provided within block 272 are holes 282 and 284 through which screws 286 and 288 extend. Screws 286 and 288 connect section 196 to pivotally mounted block 272.

The operation of adapter 186 is as follows: Camera 10 is mounted to section 190 by any suitable means (not shown). Knurled wheel is rotated clockwise (as shown by arrow 290) which rotates gear 212. Since gear 212 is meshed with gear 234, the latter is rotated to turn threaded rod 226. As rod 226 is turned, block 240 is moved toward vertical wall 194 by the coupling between threaded rod 226 and the threaded bore 238. Block 240 rides within a relatively large slot 292. As block 240 moves, section 190 pivots about section 188 through rod 220 and H-shaped member 254 pivots about block 240 and block 272. When the proper angular orientation between sections 188 and 190 has been achieved, rotation of wheel 206 is stopped. Camera 10 is now positioned such that its optical axis 54 is now parallel to the horizon. When oriented as indicated, the adapter 186 and camera 10 may be placed on a table, or the like, or mounted upon a conventional tripod through a standard threaded hole 294 provided in section 192. Note that like the first embodiment shown, adapter 186 is useable at a variety of different angles. Hence, its variability is one of its main advantages.

Figure 5:
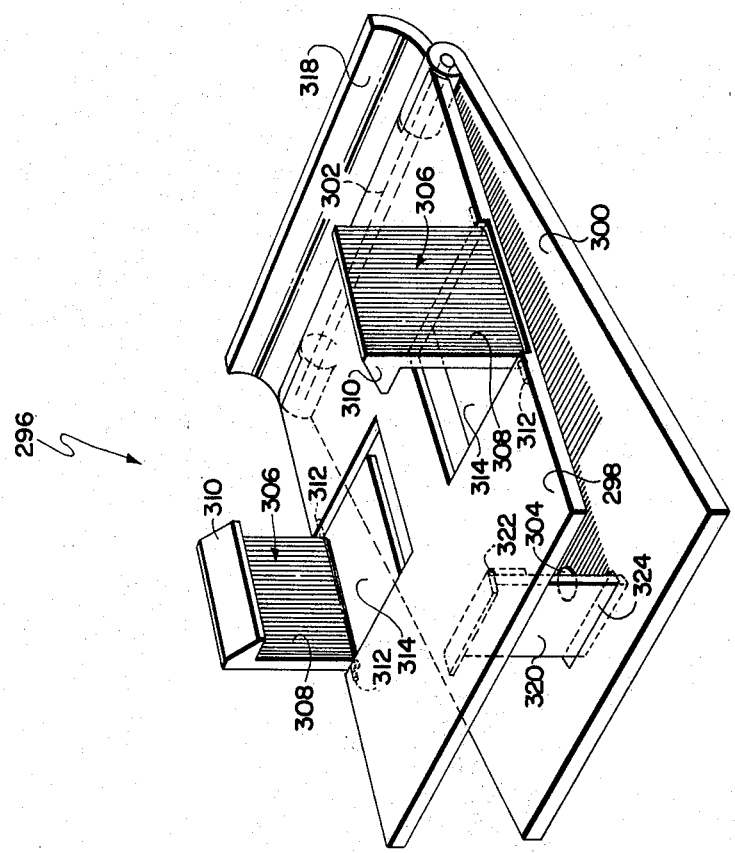
FIG. 5 is a perspective view of a third embodiment of the tripod adapter according to the present invention.

Still another embodiment of a folding adapter is shown in FIG. 5. Adapter 296 is formed having a first planar member 298 which is pivotally mounted on a second portion 300 through a rod 302. A standard sized threaded bore 304 is provided within second portion 300 for accepting the mounting screw of a conventional tripod. First member 298 is configured having a pivotally mounted detent structure 306 on its lateral edges. Detent structures 306 have a vertical wall portion 308 and a hooked portion 310. Detent structures 306 are mounted to first member 298 by rods 312 which extend through structure 306 and into member 298. Configured as such, detent structures 306 may be folded into slots 314 provided in member 298. The hooked portions 310 function to hold camera 10 to adapter 296 through a top portion 316 of side walls 32 and 34 of camera 10. The detent structures 306 are separated a distance which is equal to the width of camera 10. Accordingly, camera 10 can be easily accommodated between structures 306 for mounting purposes. Located at the rearward edge of adapter 296 is a short vertical wall 318 having a gradual slope between member 298 and wall 318. This gradual slope is provided for accommodating the sloped portion of rear wall 38 of camera 10 (see FIG. 1). In order to retain first member 298 at its elevated erected position (as shown) in (FIG. 5), a foldable tab 320 is provided. Tab 320 is pivotally mounted to the bottom of member 293 through a pin 322, and when extended downwardly, falls in a slot 324 which holds it in its extended position. Accordingly, a stable and easily foldable adapter is realized. It should be apparent that adapter 296, and its parts, may be formed of molded plastic or may be machined from a metal such as aluminum.

To attach adapter 296 to camera 10, the adapter is positioned at the rearward portion of camera 10 proximate end wall 38. The erected camera is inserted, rear end first, into adapter 296 between detent structures 306 until the rear wall 38 of camera 10 contacts the vertical wall 318 of the adapter. The sloped portion of camera 10 just below rear wall 38 now coincides with the sloped portion of the adapter. Third housing section 16 of camera 10 is adjacent the flat plane of first member 298.

When camera 10 is correctly seated upon adapter 296, the hook portions 310 fall over the top edge 316 of laterally spaced side walls 32 and 34. It is this engagement which holds adapter 296 to camera 10. When mounted, adapter 296 permits the pivoting of roller housing 48 thereby allowing the camera user to load camera 10 with film even when the adapter is mounted to camera 10 and both are mounted on a tripod. It should also be noted that adapter 296 may be attached to camera 10 only when the latter is in an erected state. Additionally, the adapter must be removed from the camera before camera 10 is folded. If this is not done, second housing section 14 will contact the top of hooked portion 310 and damage to camera 10 may occur if appreciable force is applied in an attempt to fold the camera.

When camera 10 is properly mounted upon adapter 296, the threaded bore 304 is positioned directly below the center of gravity of the erected camera 10. As a result, camera 10 is solidly supported and may be mounted upon a conventional tripod or placed upon a flat horizontal surface such as a table. When the camera 10 is placed on a table it is supported by second portion 300. It should be noted that the plane of first member 298 of adapter 296 is oriented at an angle of 15° with respect to the plane defined by second portion 300.

With the arrangment shown, the optical axis 54 of camera 10 is reoriented 15° upward and is now parallel with the horizon. It is in this reoriented position that the majority of self-timed and time exposure photographs are taken. This is true both when the adapter 296 is attached to a conventional tripod or merely placed upon a flat horizontal surface.

It should become obvious to those skilled in the art that there are a variety of ways in which to form a foldable tripod adapter for a camera of the type herein disclosed. While only a few have been discussed, they are meant to be illustrative and not limiting. Applicant has provided a tripod adapter which functions to reorient the optical axis of a camera from a normal non-horizontal position to a horizontal position and, in certain embodiments, to intermediate orientations. The foldable adapters shown are of a simple and uncomplicated design with an emphasis on easy mounting and easy removal of the adapter from the camera.

Since certain changes may be made in the above apparatus without departing from the scope of the invention herein involved, it is intended that all matter contained in the above description or shown in the accompanying drawings shall be interpreted as illustrative and not in a limiting sense.

We claim:

1. An adapter for a photographic camera having a housing and an objective lens, said adapter comprising:
    a base;
    a first member including a support section and an elongated wall substantially perpendicular and fixedly connected to said support section, said first member being structured to receive and support said camera with said housing engaging both said support section and said elongated wall;
    means associated with said support section for securing said adapter to said camera with said housing seated against said elongated wall; and
    means for pivotally connecting said first member to said base for pivotal movement about an axis positioned parallel to said elongated wall, the pivot between said first member and said base being located within an upper portion of said elongated wall.

2. The adapter according to 1 in which said adapter further includes means for releasably retaining said first member in an erected position with respect to said base.

3. The adapter according to claim 2 in which said base is formed having a bore therein through which said adapter may be coupled to a tripod, said bore being located substantially below the center of gravity of said camera when said camera is mounted to said adapter.

4. The adapter according to claim 3 in which said elongated wall limits the longitudinal movement of said camera, said elongated wall being connected to a rearward edge of said support section, said elongated wall being engageable with at least a portion of the base of said camera.

5. The adapter according to claim 2 in which said means for releasably retaining said first member at said erected position with respect to said base is formed as a pair of blades, said blades being pivotally coupled together and movable between an opened and a closed position, said closed position permitting movement of said first member with respect to said base, and said open position being operative to frictionally hold said blades for holding said first member at an angle with respect to said base.

6. The adapter according to claim 5 in which said blades are moved between said opened and closed position through an actuator means.

7. The adapter according to claim 6 on which said actuator means includes a rotatable non-circular cam, said cam being operative to cam said blades to said open position for holding said first member at said acute angle with respect to said base.

8. The adapter according to claim 2 in which said means for retaining said first member at an acute erected angle with respect to said base is formed as a screw driven assembly, said screw driven assembly being operative to selectively move a supporting link for said first member between a closed position and an opened position.

9. The adapter according to claim 1 in which said means for securing said adapter to said camera is formed as an eccentric pin driven hook, said hook being engageable with an aperture formed within the base of said camera.

10. A folding adapter for a photographic camera having a housing and an objective lens, said adapter comprising:
    a first planar section engageable with at least a portion of the supporting base of said camera for receiving and supporting said camera;
    a second planar section pivotally connected to said first section for supporting said first section in angular relationship thereto;
    detent means connected to said first section for securing said adapter to said camera, said detent means being engageable with at least a portion of said supporting base of said camera for releasably attaching said adapter to said camera, said detent means being pivotally attached to said first section for movement between an erected position and a folded position; and
    means for retaining said first section at a given angular relationship with respect to said second section.

11. The adapter according to claim 10 in which said detent means extend from the outer lateral edges of said first section.

12. The adapter according to claim 10 in which said means for retaining said first section at said given angle with respect to said second section is formed as a foldable bed foot, said bed foot being pivotally attached to a bottom portion of said first section and being pivotally movable into engagement with a portion of said second section for retaining said first section at said given angle with respect to said second section.

13. The adapter according to claim 12 in which said portion of said second section engageable with said bed foot is formed as a slot, said bed foot being engageable with said slot for providing a static support link for said first section.

* * * * *